Patented Nov. 7, 1939

2,178,606

UNITED STATES PATENT OFFICE 2,178,606

PAPER MANUFACTURE

Joseph E. Plumstead, Wilmington, Del., assignor, by mesne assignments, to Raffold Process Corporation, Andover, Mass., a corporation of Massachusetts No Drawing. Application July 11, 1933, Serial No. 679,994. Renewed February 1, 1939

9 Claims. (Cl. 92—21)

This invention relates to the preparation of fillers or pigments for use in the manufacture of paper and other materials.

An object of the present invention is to provide pigment or filler material having characteristics which render it particularly desirable for use in paper manufacture. Another object is to provide a method of treating pigment or filler material by which its opacity is improved and by which a readily sizable product is obtained. A further object is to provide highly opaque papers by including with paper making ingredients the filler material of the present invention.

In the manufacture of magnesia from dolomite, magnesium is removed from the dolomite in the form of magnesium bicarbonate by treatment with carbon dioxide solution. The magnesium carbonate is more readily removed or extracted than the calcium carbonate and a greater proportion of the magnesium carbonate is removed than of the calcium carbonate.

A method of extracting magnesium from dolomite is to burn the dolomite to form the oxides, then slake the oxides and then treat the slaked oxides with carbon dioxide to remove the magnesium in the form of magnesium bicarbonate which is converted into magnesia. The proportion of carbonate material extracted may vary and depends on the nature of the dolomite and the conditions of treatment. A sludge material containing unremoved portions of calcium carbonate and of magnesium carbonate, and certain impurities, is obtained and is discarded. This waste material has heretofore been left in great piles near magnesia plants as waste.

The residual waste material thus obtained by extraction of magnesium from dolomite is in the form of a silt, and I have found it to be highly satisfactory for use in the manufacture of paper. The silty material may be used as such, but it is preferable to treat it to remove colored or other matter that might be undesirable and also to render it more opaque and more readily sizable. It may be treated to remove grit or coarse particles by screening and elutriation.

In employing the original waste sludge material directly in paper manufacture, papers can be prepared by employing it in the proportion of 2% to 60% by weight calculated on the basis of the finished paper or total formula weight.

In cases where the color of the dolomitic waste material is particularly undesirable due to the presence of ferric oxide or hydroxide, the sludge as received from a magnesia plant is preferably pretreated. This may be done as described below.

The sludge as received contains about 60% by weight of water. It is mixed with additional water in the proportion of about 2½ pounds of the sludge to one gallon of water, calculating the weight of the sludge on the dry basis. The solid particles are maintained in a dispersed condition in the water. Any of various gelatinous substances or mordants including starch, glue, casein, aluminum hydroxide, silica gel, magnesium phosphate, or tungstic materials, or other substances which form lakes with coloring matter, are distributed on the suspended particles. Mordants may be employed to the extent of under 10% of the weight of the filler. Colorings are then added such as Prussian blue, indanthrene, methylene blue, or other paper maker's dyes. Mostly pinkish or bluish colors are imparted to the filler. This treatment can be carried out in a beater either before, or after, or while the sludge is mixed with paper stock.

The following formula has proven satisfactory:

| | Percent |
|---|---|
| Bleached sulphite pulp | approx.. 35 |
| Bleached soda | approx.. 30 |
| Calcium carbonate | approx.. 26 |
| Magnesium carbonate | approx.. 4 |
| Alkali earth sulphites | approx.. 1 |
| Starch | approx.. 4 |
| Tungstic colors | approx.. .06 |

Another treatment is to suspend the sludge particles in water as set forth above either in a mixing tank provided with stirrers or in a beater. Then a reducing agent is introduced whereby the suspended particles are whitened. For instance, hydrogen sulphide gas may be bubbled through the mixture until the particles are whitened, or are somewhat paler than the original particles. Or about 1% or more of zinc sulphite may be mixed with the suspension to whiten it.

Still another treatment is to contact the solid particles of the sludge material with carbonic acid as by bubbling carbon dioxide through a suspension of the material in an aqueous medium. The carbon dioxide may be introduced in pure form or in the form of waste gases such as combustion gases or lime kiln gases. The bubbles are preferably finely divided and uniformly distributed.

A further treatment is to add an acid material to the suspension of waste carbonate material. The acid material is one that will generate carbon dioxide from the carbonate material such as preferably sulfuric acid, or sulfurous acid, or solutions of acid calcium bisulphite.

Portions of the suspended particles are dissolved and the remaining portions forming the resulting suspension are separated from the suspending medium by filtration or other well known means and washed to dissolve out soluble substances. If desired, the acid treated particles may remain in suspension and alkaline earth hydroxide, or other soluble alkaline earth material, added to the suspension to precipitate dissolved substances in the presence of the suspended particles. For instance, if sulphuric acid, or carbonic acid, or sulphurous acid, or acid sulphites have been used in the acid treatment, alkaline earth metal salts of these acid materials are precipitated in the presence of the suspended acid treated particles of sludge material. The resulting solid material, obtained as set forth, may be subjected to wet grinding and dried, or it may be dried and then ground.

In the treatment of the sludge material with acidic substances, the latter are added to suspensions of the particles in such proportions as are insufficient to completely convert the substance of the particles into the salt of the acid used. When contacting the suspension of particles in an aqueous medium with carbon dioxide, or with sulphur dioxide, these gases are bubbled through the suspension until the particles become more opaque than the original particles, after which the passage of gases may be discontinued, or the particles may be separated from the suspending medium. In the use of solutions of acidic substances as reagents, these may be added to the suspension in predetermined proportions. In these acid treatments, the proportions determine to certain extent the degree of corrosion of the surfaces of the filler particles and are limited only to the extent that the acid is sufficient to effect a surface change rather than a complete chemical conversion.

In cases where a gas treatment is employed, or where gas is generated, it is preferable to perform such treatments before the paper stock is introduced, as, for instance, before the beater stage.

Ordinarily the acid treatment is omitted since the solid sludge particles are quite opaque and readily sizable without this treatment. The particles are spongy, or vesicular, and are rendered more so by the acid treatment. The degree of opacity and the sizability are due in part at least to the peculiar structural characteristics of the original particles of the sludge as well as of the acid treated particles.

The above treatments may be employed singly or in any desired combination, that is, any two or more of them may be used in succession. For instance, an acid treatment, or carbon dioxide treatment, or a reduction treatment, may be followed by a starch and color treatment, or a reduction treatment may be followed by a treatment with acid, such as sulfuric, sulfurous, or an acid solution of calcium bisulphite.

When a dolomitic lime material is treated with carbon dioxide there may be developed during the reaction with the carbon dioxide or carbonic acid a basic magnesium carbonate which will give undesirable results when used as a paper filler. I have found it desirable to make certain that no basic magnesium carbonate is present. I can overcome this by treatment of sludge with acids, using carbonic, sulphurous acid, alkaline earth acid sulphites, or sulphuric acids for the treatment with or without a combined hydroxide treatment such as with calcium hydroxide. If the sludge is acid, it may be partially or wholly neutralized by basic material including alkaline earth hydroxide or carbonate.

I have also found it desirable from the standpoint of opacity or hiding power not to overcome the basic carbonate by recrystallization of the magnesium salts present. These salts, particularly the basic carbonate should be changed either to the normal carbonate or to soluble salts and washed out as the perfect crystals of magnesium salts make the filler more transparent or cause less opacity.

The waste sludge material may be treated in accordance with the method disclosed in my copending application, Serial No. 561,241, filed September 4, 1931, as well as by the method described above. In applying the method of application Serial No. 561,241, the calcium carbonate and magnesium carbonate present in the sludge are converted to the corresponding acid sulphites by addition of sulphurous acid and then the acid sulphites are converted to the corresponding normal insoluble sulphites by addition of dolomite or waste sludge to the acid sulphite solution. Or, the sludge is treated directly with calcium acid sulphite solution and with, or without, magnesium acid sulphite to obtain normal sulphite material. To obtain sulphate pigment material, the acid sulphite is oxidized by addition of an oxidizing agent such as calcium hypochlorite solution plus calcium hydroxide. Also, to obtain calcium sulphate pigment, sulfuric acid may be added to the dolomitic sludge. The pigment material thus obtained by the method set forth in application Serial No. 561,241 may comprise varying proportions of calcium and magnesium salts of slight solubility. It may consist of sulphites and carbonates, sulphates and carbonates or in certain instances entirely of sulphates or entirely of sulphites. All these may be present in a crystalline or amorphous state, or as mixtures of crystalline and amorphous forms. The amorphous form, and particularly the sulphite-containing product, is preferred. If the crystalline form is too prevalent, it may be treated with acidic material that will corrode the surfaces of the particles and render the crystals more opaque, as set forth above. The treated sludge material may also be coated and colored as hereinbefore disclosed. In the above forms, the product may be either acid, neutral, or alkaline in character. It is particularly adapted for use in paper manufacture and may be combined with mechanical or other wood pulps and other paper making ingredients.

In my copending application, Serial No. 679,993 filed July 11, 1933, I have set forth a method that may also be applied to the dolomitic sludge and I disclose materials that may be combined with the product of the present invention to form an improved paper and filler product. By this latter method, a solution of sulphurous acid compound is added to the sludge to form insoluble sulphite material from at least part of the carbonates and the resulting insoluble compounds which include calcium carbonate, calcium sulphite, magnesium carbonate, and magnesium sulphite intimately mixed and in finely divided condition, form excellent pigment material. It is mixed with paper making ingredients either while in process of precipitation or after it is formed. Paper making ingredients referred to include such materials as rosin soap, mechanical wood pulp or chemical pulp, soluble starch, aluminum sulphate, clay, etc. Starch, casein, glue, or soluble cellulose compounds, may be used with my filler, to increase retention, to give greater strength to the sheet of paper, to impart a smoother sheet surface, and to obtain freedom from dust.

The sulphites precipitated as above, and as disclosed in the last-mentioned application, contain amorphous or crystalline sulphites, or mixtures of both. It is preferable to have the amorphous form present since the opacity is improved by its presence. The addition of a solution of a zinc salt to the dolomitic sludge will form an insoluble zinc compound with the magnesium and calcium carbonate. Sufficient zinc salt such as zinc chloride, zinc sulphate, or other soluble salts, are mixed with a given sludge to convert at least a portion of the carbonate in the sludge into a complex insoluble zinc composition. Less than 10% by weight of the zinc salt may be combined to give good results. The finely divided material is thereby improved in opacity.

The mixture of calcium and magnesium carbonates formed in the sludge has, under certain conditions, an alkaline reaction, which alkaline reaction when neutralized by using aluminum sulphate, sulphurous acid, calcium or magnesium bisulphites, or zinc or copper compounds, such as sulphates, chlorides, nitrates, acetates, and sulphites, will produce a finely divided product particularly adapted for producing printing papers of high quality and of unusual opacity and obscuring power. In certain instances, it is not necessary to completely neutralize the alkalinity of the mixture of the carbonates, a desirable product being prepared by partial neutralization of alkaline matter or by making the product slightly acid. The product obtained, when, for instance, sulphurous acid or bisulphites are used for changing the alkalinity, comprises calcium and magnesium sulphites, and calcium and magnesium carbonates in which the magnesium compounds are present in substantially smaller amount than is chemically equivalent to the calcium compounds present.

The pigment product of the present invention is suitable for use in paint, plastics, cloth, rubber, etc., as well as in paper manufacture. To prepare the pigment for paint and other products besides paper, it is separated from water by any suitable means and dried.

Filler particles of the present invention are generally more readily sizable and more opaque than most fillers ordinarily employed. They have substantially the same, or a greater, degree of opacity when compared with particles of domestic clays or China clays or kaolins of similar color and of approximately the same size. The particles have no definite crystalline formation, but, on the contrary, are sponge-like, pitted bodies having corroded edges which are visible when examined under a high-powered microscope. The elimination of sharp edges from crystalline particles renders them more suitable for paper making.

The spongy character of my product is indicated by its high water holding power even when subjected to reduced pressures below atmospheric. Ordinary precipitated, or crystalline calcium carbonate, when matted to a one-half inch cake on the plate of a vacuum press, and subjected to 18 inches of vacuum for a period of three minutes, will test less than 40% moisture. Filler particles of the present invention will test over 40% of moisture when subjected to the same conditions.

Certain precautions must be taken in the use of fillers in paper making, and particularly in sizing of paper in an alkaline medium as in the case of employing alkaline fillers. Heretofore it has been considered impossible to size a sheet except in the presence of distinctly acid reaction, or by the use of wax emulsions, or by temporarily lowering the alkalinity by use of an acid salt and allowing the sizing agent to precipitate before the full chemical reaction between the acid salt and the alkaline earth filler might have taken place. Sizing of paper in the presence of a water suspension having a pH range from 5.5 to 7.5 has been found quite difficult. Some sizing results have been effected by these means, but such results have been uncertain and unsatisfactory, and the use of alkaline filler has been largely limited to unsized or "waterleaf" sheets. Cupric hydroxide may be precipitated on the surfaces of the fibres as a protective gel which will absorb other colloidal materials from the same suspension. I have found that by employing various copper salts, particularly the sulphate, a superior sizing effect is obtained by the addition of amounts of copper sulphate up to 2% or 3% of the weight of the fibre and filler, and as low as $\frac{1}{10}$ of 1% of the weight of the fibre, varying the rosin soap emulsion within about the same percentage range as the copper sulphate. The rosin soap solution containing as low as about 2% rosin is added to the paper making materials. Sizing results may be varied to any desired degree from complete waterproofing to a slight sized effect by varying the amounts of sizing material and copper sulphate added to the paper making materials.

An example of a well sized sheet of book paper by employing my filler is as follows:

| | Per cent |
|---|---|
| Sulphite pulp | 30 |
| Sludge filler material | 30 |
| Soda pulp | 30 |
| Starch plus coloring | 5 |
| Rosin size | 2 |
| Copper sulphate | 3 |

The proportions are given above in terms of weight. The above mentioned materials constitute 5% of the total of which the other 95% is water.

In the application of size material to paper stock in the presence of filler, the sequence of adding chemicals is of great importance. The preferred sequence and one by means of which excellent results are obtained is, for example, as follows, the materials being added and mixed together in the order mentioned.

| | Parts by weight |
|---|---|
| Stock | 30 |
| Treated or untreated sludge material as filler, suspended in 750 parts by weight of water | 10 |
| Size figured as dry rosin (but actually added as a water emulsion) | 1 |
| Copper sulphate | 1 |
| Acid to neutralize (phenolphthalein as indicator) | |

The size in the above formula is, for instance, in the form of a rosin soap containing about 70% of saponified rosin and about 30% of free rosin.

Although it is not clearly known what the specific effect of copper sulphate is, there are strong indications that this salt prepares the fibre so that it receives the size more readily.

The acid preferred for neutralizing is sulphurous. Calcium acid sulphite solution gives highly satisfactory results. Other acid materials may be employed, but it has been found that sulphurous acid and bisulphites produce a better sizing effect than sulphuric acid, for instance. The pH of the mixture does not necessarily have to be brought below 7.

By employing the sequence referred to above, a greater degree of sizing is obtained than when, for instance, a filler is first neutralized with acid, then the stock added, then the size, and finally the copper sulphate. When the ink float test is applied to the paper obtained from both processes, the result of the test on the paper from the preferred process is as high as 12 minutes 55 seconds, whereas the result of the test on the paper obtained by employing the last-mentioned sequence is 6 minutes 10 seconds. Other sequences have been tried, but the results are not as satisfactory as the results obtained in the preferred sequence.

Reference is made to my copending application Serial No. 233,492, filed October 5, 1938, wherein is claimed certain subject matter shown herein, particularly relating to the use of substantially water-soluble copper compound and sizing agent, for example rosin size, in the manufacture of paper filled with alkaline filler, for example such as a filler comprising calcium carbonate, and the paper so made.

Another method of sizing in the presence of an alkaline solution is to fuse rosin with an oil which will give the rosin a very slightly plastic character and lower its melting point to an extent such that the melting point of the mixture will be considerably lowered below the melting point of rosin itself; in other words, approximately to the boiling point of water. Mineral oil such as a red engine oil, castor oil, linseed oil, peanut oil, corn oil, fish oil and rape seed oil give good results. The amount of these oils to be used will vary considerably in order to accomplish the desired result. I have found this variation to be from 10% to 25% of the weight of the rosin. After the rosin and oil have been fused and thoroughly mixed, the rosin oil mixture is cooled to a point where it is still liquid, but approaches the boiling point of water. If the mixture is above the boiling point of water, less of the rosin oil mixture may be used in emulsifying and a consequently thinner emulsion will be obtained. I then contact the rosin oil mixture with water and starch, water and alkaline earth carbonate, water and albumen, clay, alcohol, kerosene, or a mixture of water with any well known emulsifying agent through any of the well known types of emulsifiers or homogenizers so that an emulsion of the water, emulsifying agent and rosin-oil fusion is obtained. This emulsion may then be used in connection with an alkaline filler in the presence of paper making materials in neutral or alkaline suspension.

Printing papers ordinarily employed in magazines, for instance, have heretofore caused considerable annoyance to advertisers as well as readers. Because of lack of the proper degree of opacity in such papers, matter printed on one side of a sheet is visible on the other side, and frequently printed matter on the opposite side of a page appears to the reader to be included in the matter on the side he is reading. By the use of the pigment of the present invention and particularly pigments treated as described, a highly opaque paper is produced and the above defect is eliminated. The opacity of papers containing my pigment material compares very favorably with the opacity of other opaque papers now on the market. The cost of the latter papers is prohibitive, however, for use in the lower priced magazines because of the use of the more expensive pigments that are generally thought to be necessary to obtain the desired opacity. The difference in cost between papers containing my pigment and papers having the undesirable defect mentioned above is practically negligible.

The claims herein recite certain substantially water-soluble copper compounds. It is to be understood that these claims are intended also to cover any substantially water-soluble copper compound which, for the purpose of the present invention, is the substantial equivalent of any of the substantially water-soluble copper compounds specifically recited.

As stated in the early part of this specification, I may use in the practice of my invention as little as $\frac{1}{10}$ of 1% of copper sulphate, or of course equivalent amounts of the other copper salts referred to (calculating the copper in the copper compound used to the usual formula for copper sulphate—$CuSO_4.5H_2O$—and basing the percentage on the weight of the fiber used). Thus where in the claims I employ the expression "copper compound selected from a group", I mean that there should be used not less than the above proportion as a minimum in the processes claimed and also in the processes from which resulted the products claimed.

I claim:

1. In a process of manufacturing paper filled with a filler comprising a substantially water-insoluble carbonate, the steps of bringing into substantially intimate contact materials comprising substantially water-insoluble carbonate and a copper compound selected from a group consisting of copper sulphate, copper chloride, copper nitrate and copper acetate, in the presence of water, whereby a reaction between the copper compound and said carbonate is effected, and adding the resulting material to fibrous material.

2. In the manufacture of filled paper comprising fibrous material and filler which comprises substantially water-insoluble carbonate, the said filler being in substantially intimate association with the said fibrous material, the steps of providing materials comprising substantially water-insoluble carbonate and a copper compound selected from a group consisting of copper sulphate, copper chloride, copper nitrate and copper acetate, as ingredients in said manufacturing process and effecting a reaction therebetween.

3. In the manufacture of filled paper comprising fibrous material and filler which comprises calcium carbonate, the said filler being in substantially intimate association with the said fibrous material, the steps of providing materials comprising calcium carbonate and a copper compound selected from a group consisting of copper sulphate, copper chloride, copper nitrate and copper acetate, as ingredients in said manufacturing process and effecting a reaction therebetween.

4. In the manufacture of filled paper comprising fibrous material and filler which comprises substantially water-insoluble carbonate, the said filler being in substantially intimate association with the said fibrous material, the steps of providing materials comprising substantially water-insoluble carbonate and a copper compound selected from a group consisting of copper sulphate, copper chloride, copper nitrate and copper acetate, in the fibrous mix from which said paper is to be made and effecting a reaction therebetween.

5. In the manufacture of filled paper comprising fibrous material and filler which comprises calcium carbonate, the steps of providing materials comprising calcium carbonate and a copper compound selected from a group consisting of copper sulphate, copper chloride, copper nitrate and copper acetate, in the fibrous mix from which said paper is to be made and effecting a reaction therebetween.

6. In a process of manufacturing paper filled with a filler comprising calcium carbonate, the steps of bringing into substantially intimate contact materials comprising calcium carbonate and a copper compound selected from a group consisting of copper sulphate, copper chloride, copper nitrate and copper acetate, in the presence of water, whereby a reaction between the copper compound and said carbonate is effected, and adding the resulting material to fibrous material.

7. In a method of producing a paper including a pigment prepared by the burning of dolomitic limestone, slaking the resultant lime and magnesia to the hydroxides and dissolving out and removing a substantial amount of the magnesium compound by means of carbon dioxide; the steps of treating said pigment with a copper compound selected from a group consisting of copper sulphate, copper chloride, copper nitrate and copper acetate, to effect a reaction therebetween, and adding the resulting material to paper making materials.

8. Filled paper comprising fibrous material and filler comprising substantially water-insoluble carbonate, the said filler being in substantially intimate association with the said fibrous material, and a substantially water-insoluble copper compound resulting from a reaction of a copper compound selected from a group consisting of copper sulphate, copper chloride, copper nitrate and copper acetate, with substantially water-insoluble carbonate.

9. Filled paper comprising fibrous material and filler comprising calcium carbonate, the said filler being in substantially intimate association with the said fibrous material, and a substantially water-insoluble copper compound resulting from a reaction of calcium carbonate with a copper compound selected from a group consisting of copper sulphate, copper chloride, copper nitrate and copper acetate.

JOSEPH E. PLUMSTEAD.